June 30, 1953  J. E. SOCKE  2,643,778
CONVEYER MECHANISM WITH ARTICLE TURNING UNITS
Filed Dec. 30, 1948  6 Sheets-Sheet 1
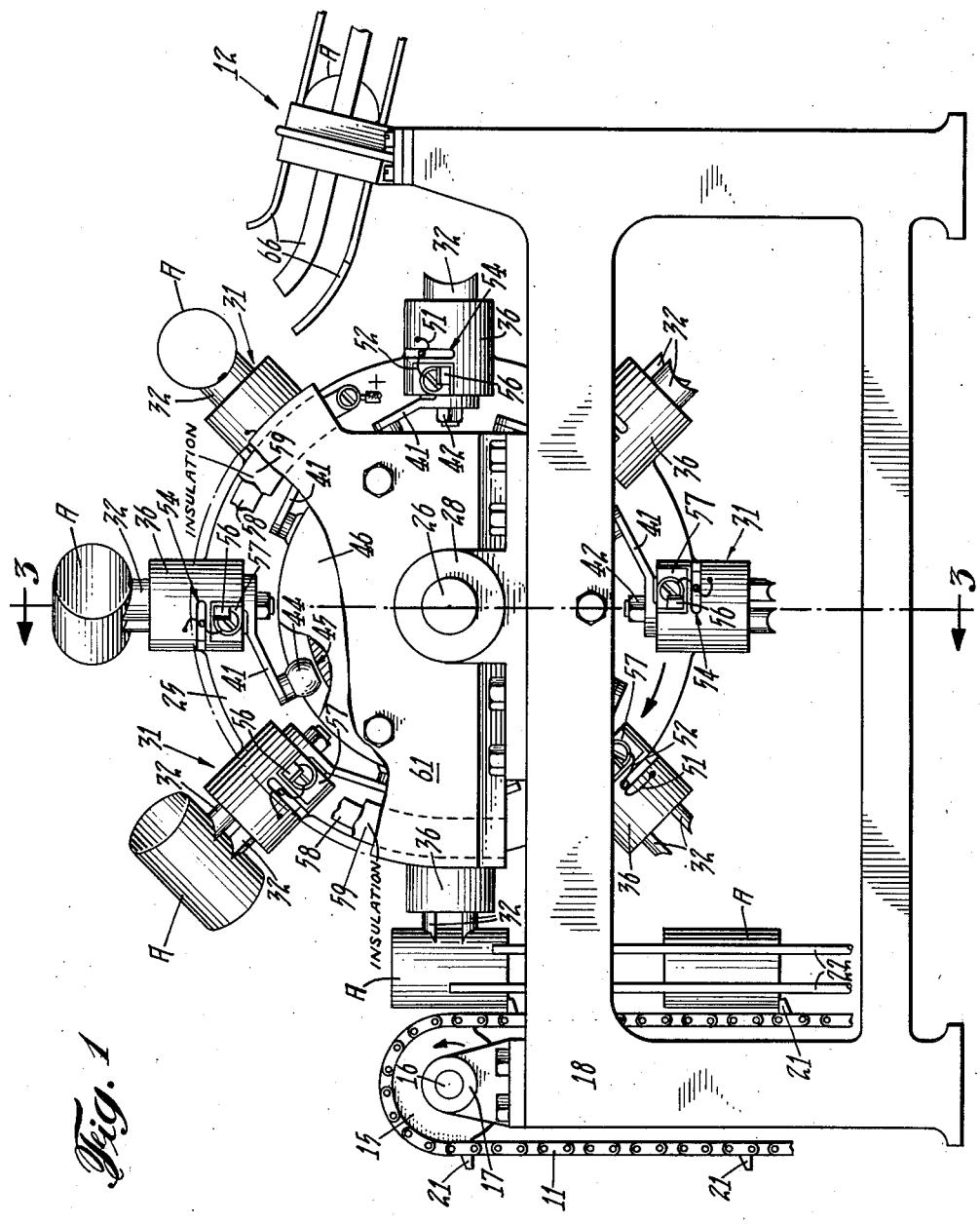
INVENTOR.
JOHN E. SOCKE
BY Ivan D. Thornburgh
Charles H. Lune
ATTORNEYS June 30, 1953   J. E. SOCKE   2,643,778
CONVEYER MECHANISM WITH ARTICLE TURNING UNITS
Filed Dec. 30, 1948   6 Sheets-Sheet 2
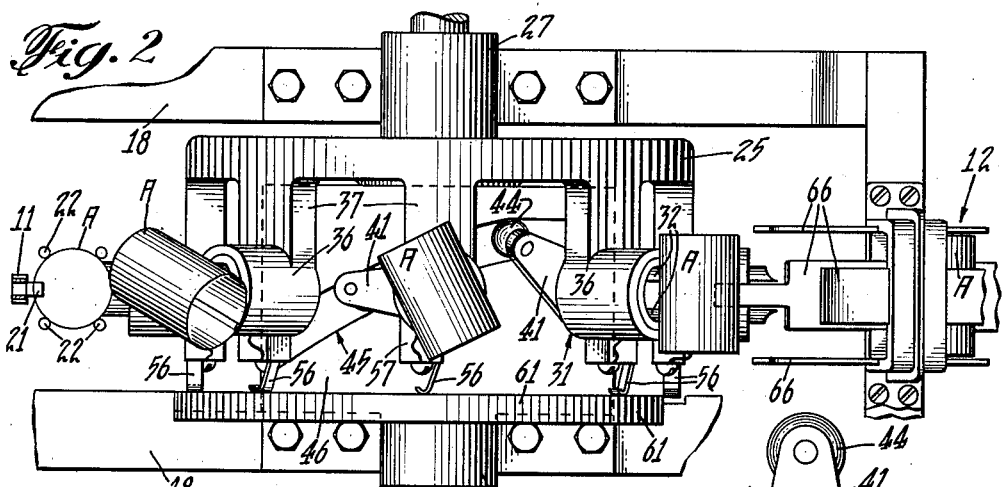
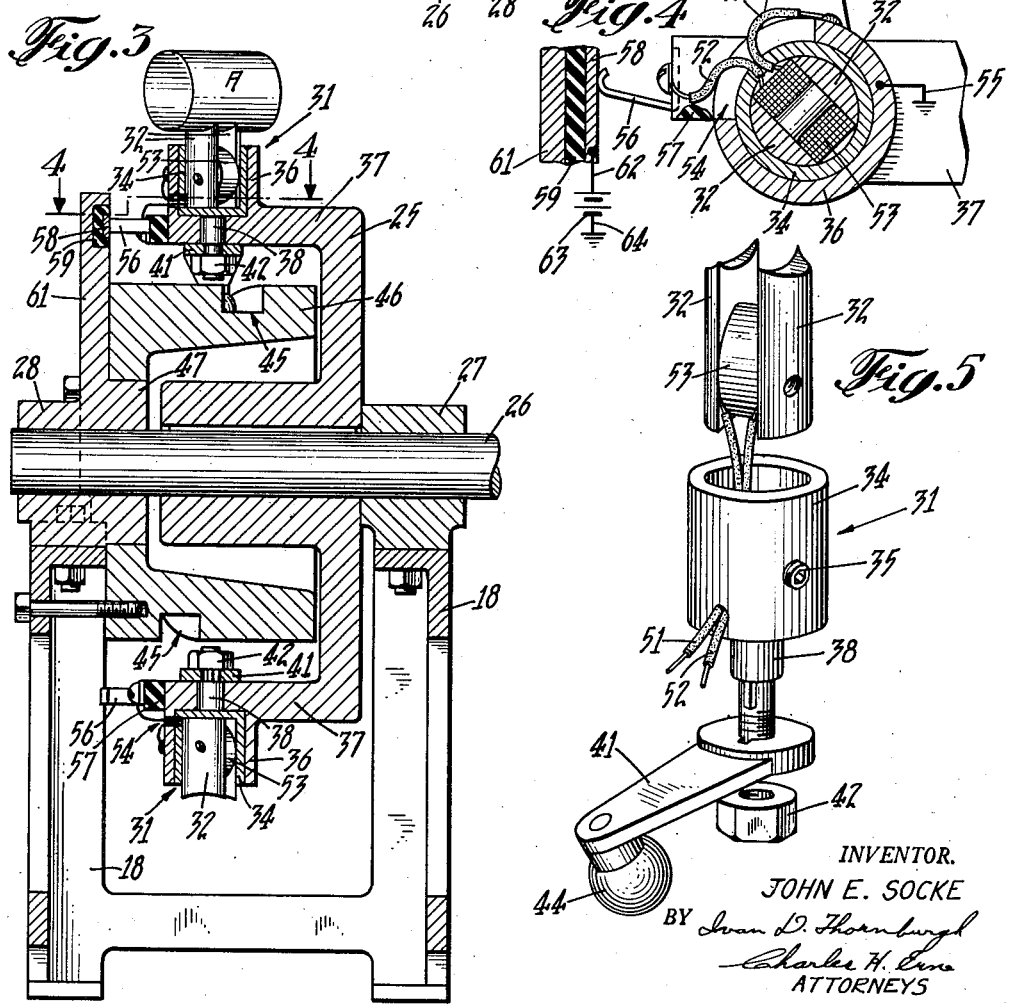
INVENTOR.
JOHN E. SOCKE
BY
ATTORNEYS June 30, 1953    J. E. SOCKE    2,643,778
CONVEYER MECHANISM WITH ARTICLE TURNING UNITS
Filed Dec. 30, 1948    6 Sheets-Sheet 3

INVENTOR.
JOHN E. SOCKE
BY Ivan D. Thornburgh
Charles H. Dunn
ATTORNEYS

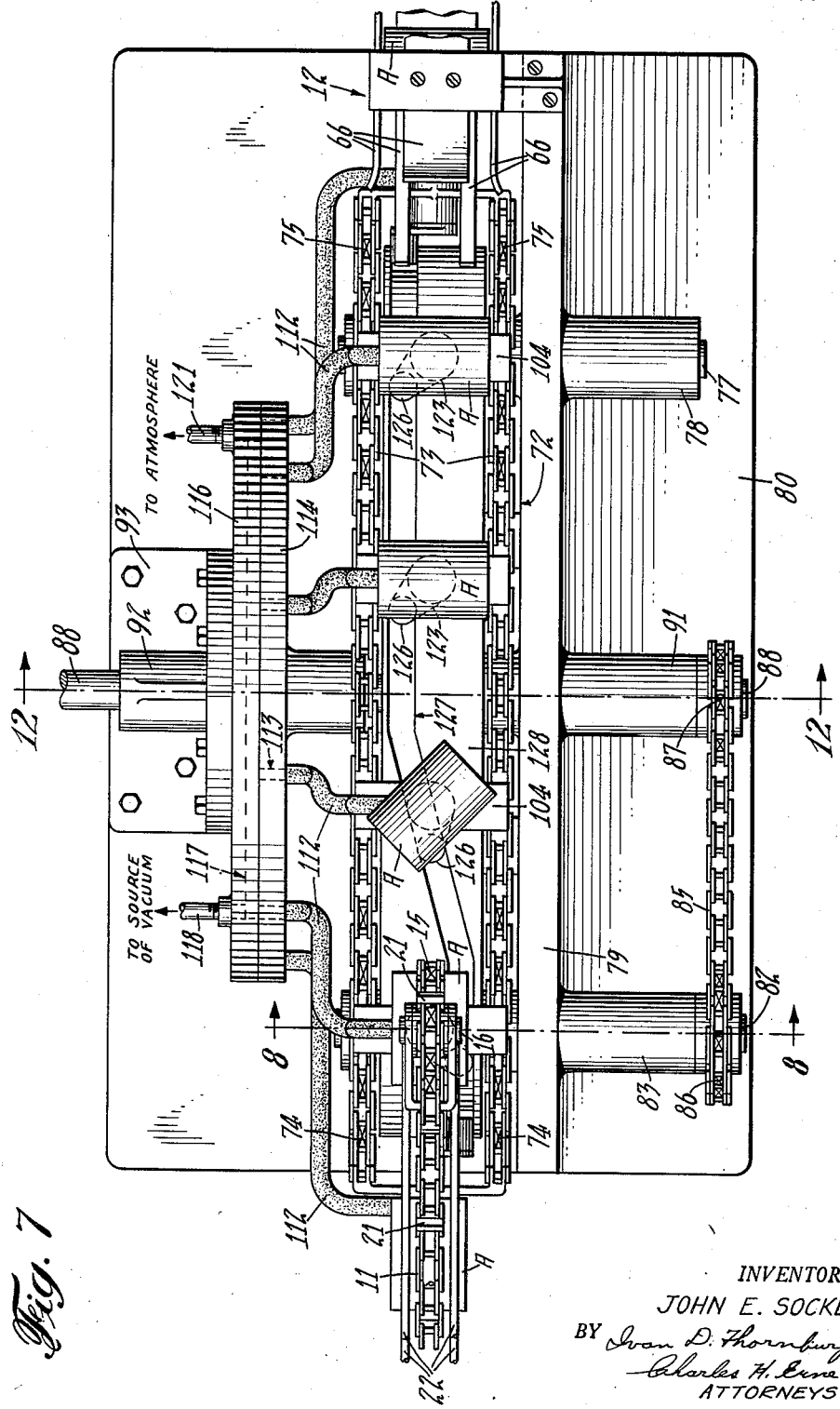

June 30, 1953  J. E. SOCKE  2,643,778
CONVEYER MECHANISM WITH ARTICLE TURNING UNITS
Filed Dec. 30, 1948  6 Sheets-Sheet 5
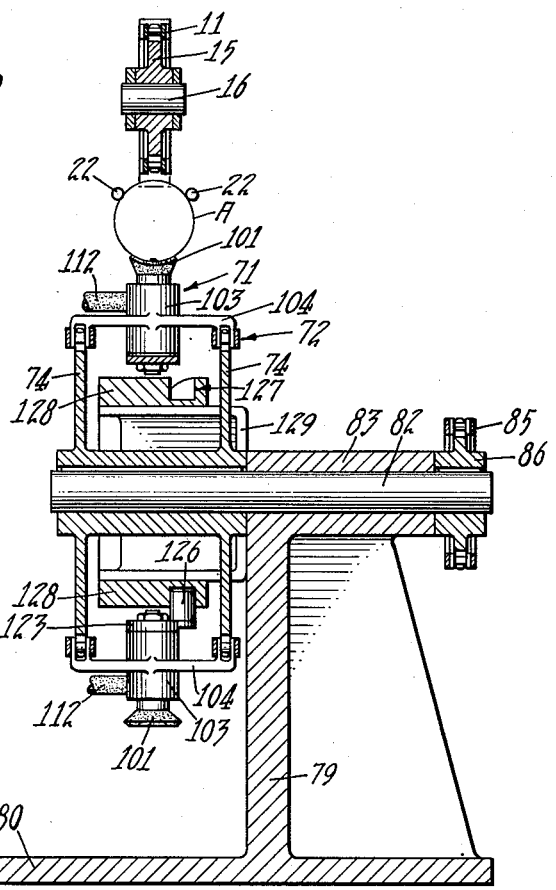
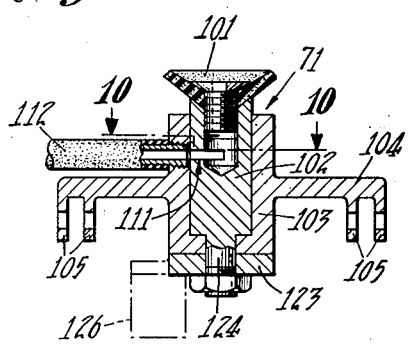
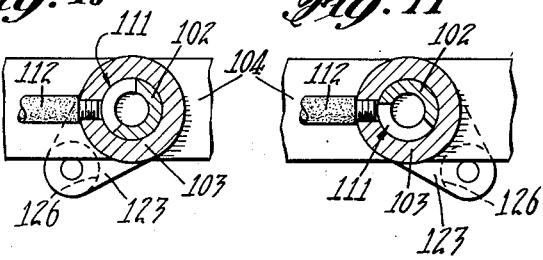
INVENTOR.
JOHN E. SOCKE
BY Ivan D. Thornburgh
Charles H. Erne
ATTORNEYS June 30, 1953 J. E. SOCKE 2,643,778
CONVEYER MECHANISM WITH ARTICLE TURNING UNITS
Filed Dec. 30, 1948 6 Sheets-Sheet 6

INVENTOR.
JOHN E. SOCKE
BY Ivan D. Thornburgh
Charles H. Lane
ATTORNEYS

Patented June 30, 1953

2,643,778

UNITED STATES PATENT OFFICE 2,643,778

CONVEYER MECHANISM WITH ARTICLE TURNING UNITS

John E. Socke, Pelham Manor, N. Y., assignor to American Can Company, New York, N. Y., a corporation of New Jersey Application December 30, 1948, Serial No. 68,125

5 Claims. (Cl. 214—1)

The present invention relates to a conveyor mechanism for can bodies and other articles and has particular reference to devices for gently turning the articles from one position into another position while they are traveling along a predetermined path of travel.

In the manufacture of cans or containers and parts thereof fabrication of the articles usually is effected progressively in a series of machines connected by runways and commonly called a can line. In such a line it is sometimes necessary to turn the articles from an endwise position into a sidewise position or vice versa to properly operate upon them. This is sometimes accomplished by dropping or otherwise bringing the articles into contact with a stationary turning peg and catching them in the desired position as they turn, for further advancement in the turned position. With fragile articles such turning practice sometimes dents, nicks, bends or otherwise mars the articles in such a manner as to render them useless or to cause serious difficulty in effecting subsequent operations upon them.

The instant invention contemplates overcoming this difficulty by providing a mechanism in which the articles are handled gently.

An object of the invention is the provision of a mechanism for turning articles wherein the articles may be received in a convenient discharge position from a source of supply of the articles such as a machine or a conveyor and repositioned or turned into another position for convenient reception by another machine or conveyor for a subsequent operation, while the articles are moving in a substantially continuous procession.

Another object is the provision of such a turning mechanism wherein the articles are turned gently and while fully supported and under control so that denting, nicking, bending or otherwise marring or injuring of the articles is eliminated.

Another object is the provision of such a turning mechanism which is compact in construction and which is particularly adapted for use between successive machines in a line where space requirements are reduced to a minimum.

Numerous other objects and advantages of the invention will be apparent as it is better understood from the following description, which, taken in connection with the accompanying drawings, discloses a preferred embodiment thereof.

Referring to the drawings:

Figure 1 is a side view of a conveyor mechanism embodying the instant invention, with parts broken away, the view showing can bodies in variously turned positions in the mechanism;

Fig. 2 is a top plan view of the mechanism shown in Fig. 1, with parts broken away;

Fig. 3 is a transverse sectional view taken substantially along the line 3—3 in Fig. 1, with parts broken away;

Fig. 4 is an enlarged sectional detail taken substantially along the broken line 4—4 in Fig. 3, with parts broken away and including a simplified wiring diagram of electric apparatus used with the mechanism;

Fig. 5 is an enlarged exploded perspective view of the parts of the can body turning unit shown in the upper portion of the mechanism as illustrated in Fig. 3;

Fig. 7 is a top plan view of the mechanism and its can bodies shown in Fig. 6, with parts broken away;

Fig. 8 is a transverse sectional view taken substantially along the line 8—8 in Fig. 7, with parts broken away;

Fig. 9 is an enlarged sectional detail taken substantially along the line 9—9 in Fig. 6, with parts broken away;

Figs. 10 and 11 are sectional views taken substantially along the line 10—10 in Fig. 9, the views showing certain of the parts in different positions.

Figure 6:
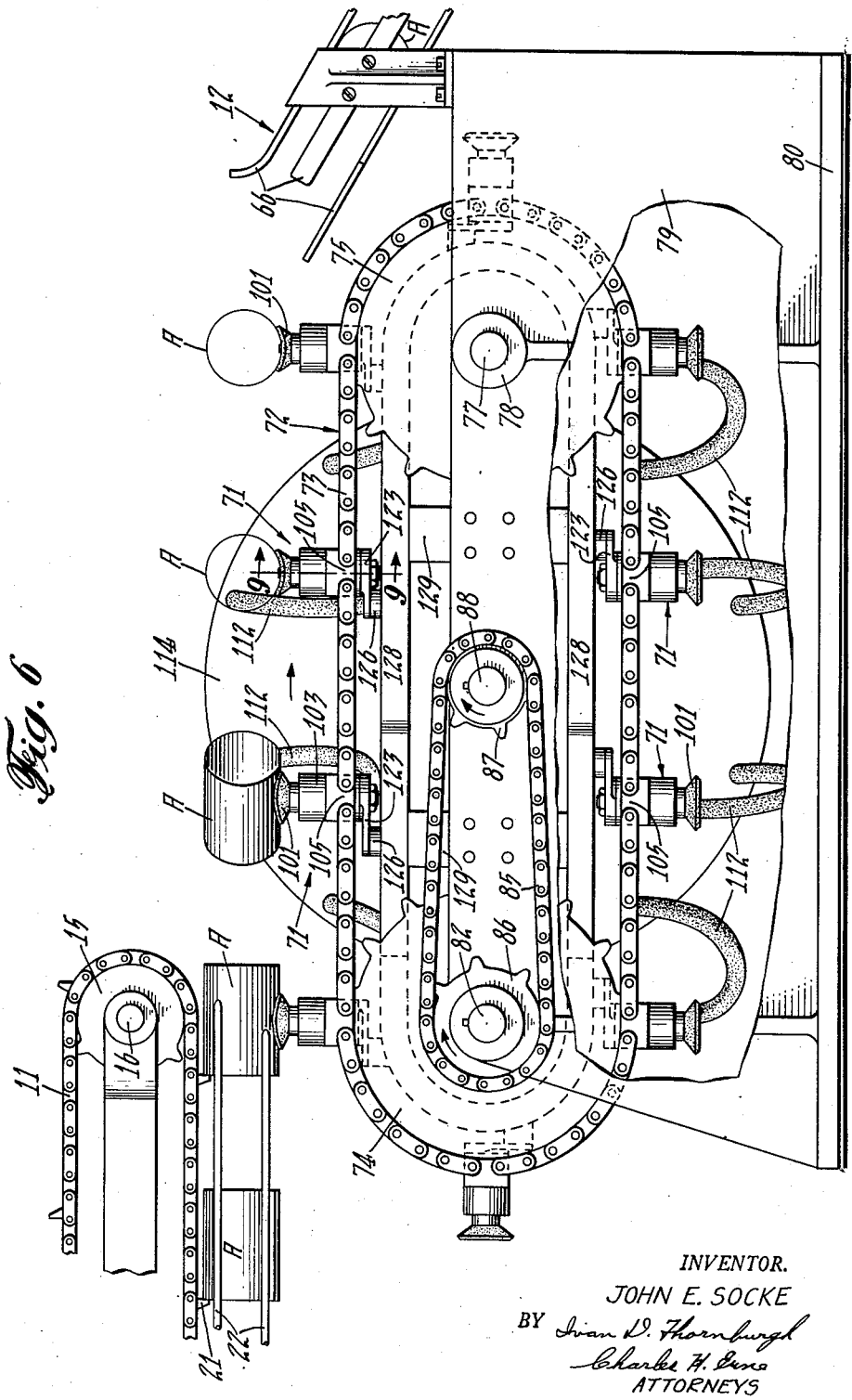
Fig. 6 is a side view of a modified form of apparatus embodying the instant invention, with parts broken away, the view showing can bodies in place in the mechanism.
Figure 12:
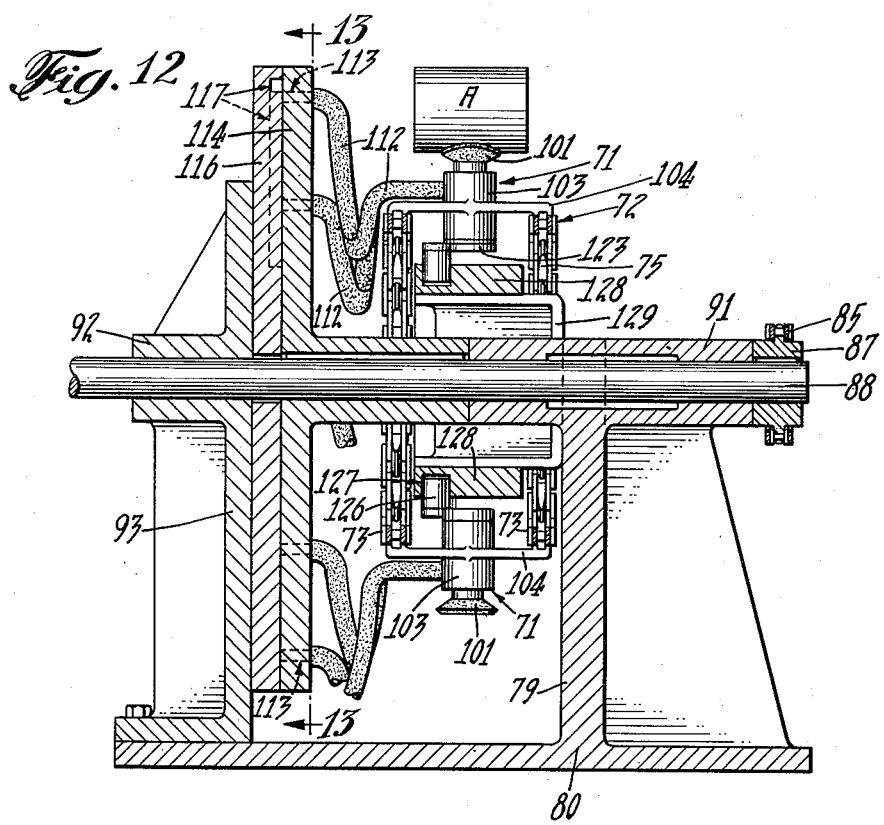
Fig. 12 is a sectional view taken substantially along the line 12—12 in Fig. 7, with parts broken away.

As a preferred and exemplary embodiment of the instant invention Figs. 1 to 5 inclusive of the drawings disclose a conveyor mechanism which is adapted to be placed between successive machines in a can line and which is utilized for receiving sheet metal can bodies A from one of the machines and for turning them gently into a predetermined position for subsequent treatment in the other of the machines before discharge into this latter machine. However, the invention is equally well adapted to articles other than can bodies and to articles made of non-metallic as well as metallic materials as disclosed in the modified form of the invention.

By way of example, Figs. 1 to 5 inclusive of the drawings disclose such a can body turning mechanism interposed between an endless chain conveyor 11 (Fig. 1) and a stationary discharge chute 12 for receiving the can bodies A from the conveyor in an endwise relation and for repositioning or turning them into a sidewise relation so that they will roll on their sides along the chute 12 to a subsequent operation machine when they are discharged into the chute. It should be understood however that this receiving and discharge relation may be reversed if desired, by transposition of the conveyor and the chute.

The conveyor 11 may be a conventional elevator as used in can making factories for transferring partially fabricated cans from one machine to another or may be an ordinary transfer conveyor, disposed in either a vertical or a horizontal position for the same purpose. The mechanism end of this endless chain conveyor operates preferably over a driven sprocket 15 mounted on a continuously rotating drive shaft 16 journaled in a pair of spaced bearing brackets 17 bolted to a pair of spaced and parallel side frames 18 which constitute the main frame of the mechanism.

The drive shaft 16 may be rotated in any suitable manner either independently or by connection with the machine from which the conveyor receives the can bodies. The conveyor chain 11 is fitted with spaced feed dogs 21 which propel the can bodies A in spaced and timed order in endwise relation and in a substantially continuous procession along a plurality of spaced and parallel guide rails 22 disposed adjacent the feeding run of the conveyor. The guide rails 22 terminate adjacent the conveyor sprocket 15. This is a conventional conveyor or elevator structure.

As a can body A being propelled by the conveyor 11 approaches the terminal end of the guide rails 22, it is picked up by the turning mechanism and is carried toward the discharge chute 12. For this purpose the turning mechanism includes a movable carrier or transfer member which in the preferred form of the invention is a carrier disc or wheel 25 (Figs. 1 and 2) which is rotatable relative to and in time with the endless chain conveyor 11.

The carrier wheel 25 is located between the side frames 18 and is keyed onto and is continuously rotated by a horizontally disposed driven shaft 26 journaled in a pair of spaced bearing brackets 27, 28 bolted to the side frames 18. The shaft is driven in any suitable manner in time with the conveyor sprocket shaft 16, such as for example by way of a chain and sprocket connection between the conveyor sprocket shaft 16 and the wheel driven shaft 26.

Picking up of the can bodies A from the conveyor 11 is effected preferably by a magnetic transfer or turning unit 31 which moves with the wheel 25 and which grips and supports a can body during the turning operation. There are a plurality of these transfer units 31 spaced around the outer periphery of the wheel in accordance with the spacing of the can bodies advanced by the conveyor 11.

Each of the transfer units 31 includes a gripper member such as a horseshoe magnet 32 (see also Fig. 5) which may be a permanent magnet if desired or which may be a normally deactivated gripper such as the normally de-energized electromagnet shown in the drawings. These magnets are disposed in a radial position relative to the periphery of the wheel 25 with their legs extending outwardly. At their outer ends, the legs are shaped to fit the curvature or other contour of a can body and thus serve as a saddle or support for the body as best shown in Figs. 1, 3 and 5.

Each of the magnets 32 at its inner end is housed in an oscillatable nonmagnetic cup-shaped casing or turning element 34 (Fig. 5) and are locked in place by a set screw 35 threadedly engaged in a side wall of the casing. There is one of these casings for each magnet. The casings are disposed in radial cup-shaped bearings 36 formed on arms 37 which project laterally from the inner face of the wheel 25. At its inner end, each casing 34 is formed with a trunnion 38 (Fig. 3) which extends through an aperture in the bottom of the associated bearing 36.

Beyond the bearing 36, the trunnion 38 is keyed to a turning lever 41 which is held in place by a lock nut 42 threadedly engaged on a threaded portion of the trunnion. The free end of the turning lever 41 carries a cam roller or ball 44 which operates in a cam groove 45 formed in a stationary barrel cam 46 disposed adjacent the carrier wheel 25 and secured to a hub 47 (Fig. 3) of the wheel shaft bearing 28. The cam 46 effects the turning of magnets 32 and the can bodies A held thereon as will be hereinafter explained.

Electric current for operating the electromagnets 32 is supplied from any suitable source of current, through a pair of wires 51, 52 (Fig. 4) which are connected to a coil 53 interposed between the legs of each of the magnets. These wires extend through an aperture in the casings 34 and project from a slot 54 formed in the bearings 36. The wires 51 are secured to the bearings 36 and thus through the machine are connected to a ground 55 (Fig. 4).

The wires 52 are connected to current conducting brushes or shoes 56 which are secured to insulator blocks 57 attached to the bearings 36. There is one shoe 56 for each magnet. The free ends of the shoes engage against a stationary curved electrode 58 which is disposed adjacent the path of travel of the magnets 32 and which extends in a clockwise direction as viewed in Fig. 1, from a starting place adjacent the conveyor 11 to a terminus adjacent the chute 12. This electrode 58 (see also Fig. 3) is set into an insulator 59 secured in a recess formed in an upright plate 61 which is integral with the wheel shaft bearing 28 and the cam retaining hub 47. The electrode 58 is connected by a wire 62 (Fig. 4) to a source of electric current 63 which in turn is connected by a ground wire 64 to a suitable ground.

Hence, as the carrier wheel 25 rotates in its clockwise direction as viewed in Fig. 1, and as hereinbefore mentioned, the can body turning units 31 move with the wheel and their current conducting shoes 56 during a portion of their travel, ride along the electrode 58 and during the remainder of their travel are free of the electrode. In a similar manner the turning levers 41 of the turning units 31 trail the units as they move with the carrier wheel 25 and thus cause their cam rollers 44 to traverse the cam groove 45 in the stationary cam 46. The groove is designed to turn or reposition the units as they travel from the conveyor 11 to the chute 12 and to hold them stationary in can body receiving position during the remainder of their travel.

Thus as a turning unit 31 travels under the carrier wheel 25 as viewed in Fig. 1 and moves upwardly toward a can body A advancing on the conveyor 11 in time with the turning unit, the de-energized magnet 32 is in proper angular position, in respect to the axis of the can body to receive the can body, and the body and the magnet gently meet as they approach each other at the terminal end of the guide rails 22 as viewed in Fig. 1. As the magnet engages the can body the current conducting shoe 56 of the magnet rides up onto the electrode 58 and this establishes an electric circuit through the coil 53 of the magnet and thus energizes the magnet. This causes the can body A to cling to the magnet.

With a can body A clinging to the energized magnet 32, the body leaves the conveyor 11 and continues its travel with the carrier wheel 25 toward the chute 12. During this portion of the travel of the can body the current conducting shoe 56 remains in contact with the electrode 58 and the magnet thus remains energized to hold and support the body.

As soon as the can body held by the magnet is clear of the conveyor 11 and its guide rails 22, the cam roller 44 of the turning unit 31 begins to traverse a diverging portion of the cam groove 45 which portion of the groove shifts the turning lever 41 and thus rotates the magnet casing 34 in its bearing 36. This rotation of the casing and the magnet therein continues as the carrier wheel 25 advances until the held can body is completely turned or repositioned on the axis of the casing, from the endwise relation of the body into the sidewise relation as best shown in Figs. 1 and 2. The axis of the can body is thus shifted through an angle of ninety degrees from the position in which the body was received. Within certain limits the shifting of the can body axis could be varied as desired.

When the turning unit and the body A reach the chute 12, the body is in a full sidewise relation. At this place in the cycle of operation of the mechanism the current conducting shoe 56 rides off the electrode 58 and the magnet 32 thereupon becomes de-energized. This releases the can body from the magnet and the body thereupon is stripped off the magnet and falls on its side into the chute 12 and rolls therealong to the subsequent operation machine as hereinbefore mentioned. Guide rails 66 (Figs. 1 and 2) forming a part of the chute confine and direct the rolling can body to its destination. The bottom guide rail 66 acts as a stripper for removing the body from the magnet.

After delivering the can body A into the chute 12, the cam groove 45 in the cam 46 shifts the cam roller 44 and its turning arm 41 of the turning unit 31 back into its normal position as the unit travels downwardly under the carrier wheel. This oscillates the casing 34 and its deenergized magnet 32 into their normal positions where the magnet is again in proper angular position to receive another can body in an endwise relation from the conveyor 11. This completes the cycle of operation of the mechanism.

In the modified form of the invention as disclosed in Figs. 6 to 13 inclusive, the can bodies A or other articles are carried from the endless chain conveyor 11 to the stationary discharge chute 12 or vice versa, by pneumatic gripper units 71 (Figs. 6, 8, 9 and 12) mounted on an endless chain transfer conveyor or carrier 72 having rectilinear movement instead of by the magnets 32 mounted on the carrier wheel 25 as in the first described embodiment.

In this modified form of the invention the chain transfer conveyor or carrier 72 comprises two spaced and parallel endless chains 73 which operate over a pair of spaced and parallel drive sprockets 74 located at the entrance end of the machine (at the left as viewed in Figs. 6 and 7) adjacent the feed-in conveyor 11 and over a similar pair of idler sprockets 75 located at the discharge end of the machine (at the right in Figs. 6 and 7) adjacent the discharge chute 12. The idler sprockets 75 are mounted on a transverse idler shaft 77 journaled in a long bearing 78 formed on an upright web section 79 of a frame 80 which constitutes the main frame of the machine.

The driving sprockets 74 are mounted on a drive shaft 82 (see also Fig. 8) journaled in a long bearing 83 formed on the web section 79 of the frame. This drive shaft is continuously rotated by an endless driving chain 85 which operates over a sprocket 86 mounted on the drive shaft 82 and over a sprocket 87 mounted on a main drive shaft 88. The main drive shaft 88 (see Fig. 12) is located between the idler sprocket shaft 77 and the drive sprocket shaft 82 and is journaled in a bearing 91 formed in the frame web section 79 and in a spaced bearing 92 formed in a bracket 93 bolted to the main frame 80. This main drive shaft 88 is rotated continuously in any suitable manner and through this shaft the entire conveyor 72 is operated continuously.

The pneumatic gripper units 71 carried on the conveyor 72 are arranged in spaced order along the conveyor and include resilient vacuum cups 101 (Figs. 6, 8, 9 and 12). There is one vacuum cup 101 for each gripper unit 71. Each vacuum cup is secured to a hollow stem or turning element 102 (Fig. 9) which is rotatably mounted in a vertical position in a bearing 103 formed on a cross bar 104, the ends of which are provided with lugs 105 constituting links of the conveyor chains 73. The bearings 103 are located between the chains 73, and the cross bars 104 span the space between the chains and connect the chains transversely so that the bars move with the chains.

Hence as the conveyor chains 73 operate over the driving sprockets 74 and the idler sprockets 75, they carry the gripper units 71 in a continuous procession upwardly around the driving sprockets 74 and past the entrance conveyor 11 and thence along a horizontal straight line path of travel along the upper run of the conveyor 72, and then downwardly around the idler sprockets 75 past the discharge chute 12 and into the lower runs of the conveyor.

Figure 13:
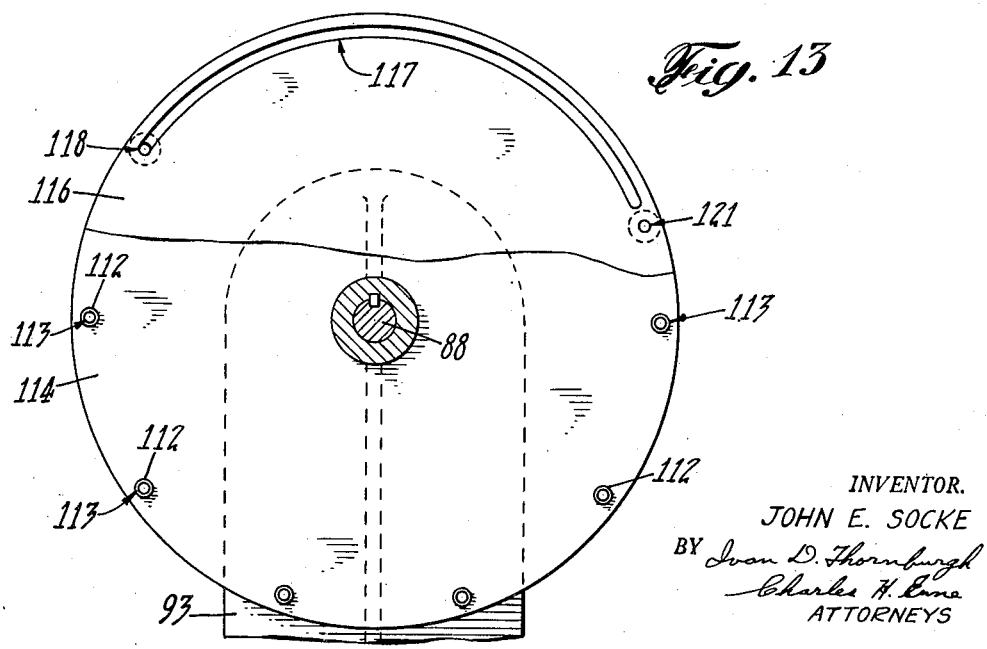
Fig. 13 is a sectional view taken substantially along the line 13—13 in Fig. 12, with parts broken away.

As a gripper unit 71 is propelled past the entrance conveyor 11, the vacuum cup 101 of the unit presses against the can body A being discharged from the entrance conveyor and simultaneously with this action a vacuum is created in the cup to pick off the engaged body and hold it tightly on the gripper unit for movement with the unit. For this purpose the turning element 102 of the gripper unit is formed with a segmental slot 111 (Figs. 9, 10 and 11) which communicates with the interior of the turning element and with one end of a flexible vacuum tube 112 secured in the side of the unit bearing 103. The opposite end of the tube 112 is connected into a port 113 (Figs. 7, 12 and 13) formed in and extending through a rotary valve disc 114 mounted on and rotating with the main drive shaft 88. There is one of these tubes 112 and ports 113 for each gripper unit 71 and the ports are arranged in spaced relation around the valve disc 114 adjacent its outer periphery as best shown in Fig. 13. The valve rotates once for each complete cycle of travel of a gripper unit 71 around the sprockets 74, 75 with the conveyor chains 73 so that a unit and its port are maintained in a predetermined relation.

The rotary valve disc 114 operates against a stationary valve plate 116 which is secured to the upright bracket 93. This plate 116 is formed with a curved groove 117 (Figs. 12 and 13) which is in alignment with the path of travel of the ports 113 in the rotary disc 114. One end of this groove 117 communicates with a vacuum pipe 118 (Figs. 7 and 13) which is secured in the plate 116 and which leads to any suitable source of vacuum. Through this connection the groove 117 is maintained continuously in a vacuumized condition.

The groove 117 is so located that when a gripper unit 71 moves into position adjacent a body A on the conveyor 11, the port 113 of this unit moves into register and communication with the groove and hence the cup 101 of the unit is immediately vacuumized as hereinbefore mentioned to grip and hold the body A on the unit. The groove is of sufficient length to maintain this cup in its vacuumized condition until the unit 71 reaches the discharge chute 12.

As the gripper unit 71 passes the chute 12, the port 113 of the unit moves out of communication with the groove 117 and registers with an atmosphere pipe 121 secured in the valve plate 116 adjacent the terminal end of the groove 117. This pipe is open to the outside atmosphere. Thus the vacuum is cut off from the cup 101 and the outside atmosphere is admitted into the cup. This breaks the vacuum in the cup and releases the can body A into the chute 12.

Turning of the body A from the position it is received from the entrance conveyor 11 into the position in which it is to be discharged into the chute 12 is effected while the gripper unit 71 moves along the upper run of the conveyor 72. This turning action is effected by a turning lever 123 (Figs. 6, 7 and 9) which is secured to a trunnion 124 (Fig. 9) projecting from the turning element 102. The free end of the turning lever 123 carries a cam roller 126 which operates in a cam groove 127 of a stationary cam rail 128 which extends along the path of travel of the conveyor 72. The cam rail is supported on brackets 129 secured to the upright web section 79 of the main frame 80.

Hence as soon as a can body A held by a gripper unit 71 is clear of the entrance conveyor 11 and its guide rails 22, the cam roller 126 of the gripper unit, in traversing the stationary cam groove 127, enters a diverging portion of the groove which shifts the turning lever 123 and thus rotates the turning element 102 in its bearing 103. This rotation of the turning element and the vacuum cup secured thereto continues as the conveyor 72 advances until the held can body is completely turned on the axis of the bearing 103, from the endwise relation of the body into the sidewise relation as best shown in Figs. 6 and 7. The segmental slot 111 in the turning element 102 is of sufficient length to keep the vacuum cup in communication with the vacuum pipe 112 during this turning operation so as to maintain the cup in a vacuumized condition.

When the gripper unit 71 and its held body A reaches the chute 12, the body is in a full sidewise relation. Hence when the body is released, by the breaking of the vacuum in the cup 101 as hereinbefore explained, the body falls into the chute 12 and rolls on its side, guided by the rails 66 of the chute, to any suitable place of deposit. The bottom guide rail 66 serves as a stripper for removing the body from the vacuum cup.

After delivering a can body A into the chute 12, the cam groove 127 of the stationary cam 128 shifts the cam roller 126 and its turning arm 123 of the gripper unit 71 back into its normal position as the unit travels downwardly around the idler sprockets 75 and along the lower run of the conveyor 72. This oscillates the turning element 102 into its normal position to receive another can body in an endwise relation from the conveyor 11. This completes the cycle of operation of the mechanism.

Thus in both of the described forms of the instant invention, can bodies or other articles traveling singly or in a continuous procession may be received in one convenient position and gently turned into another desired position best adapted for subsequent gripping or other reception, while maintaining the article under full control and without damaging the article in any respect.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a mechanism for conveying and positioning magnetizable articles such as can bodies, the combination of a movable electro-magnet gripper unit engageable with a magnetizable article for receiving and holding said article, transfer means for moving said gripper unit along a predetermined path of travel, article turning means for turning said unit into one position for receiving said article in axial alignment with said path and for turning said unit and the received article into another position to reposition the article for further disposition, means for feeding said articles in the direction of and axially into said predetermined path and means for energizing and deenergizing said electro-magnet gripper unit in time with the travel of said unit for holding said article on and releasing it from said unit.

2. In a mechanism for conveying and positioning cylindrical can bodies, the combination of a conveyor for advancing can bodies in a direction longitudinally of their axes, a stationary discharge chute spaced from said conveyor for guiding rolling can bodies, a transfer device located between said conveyor and said discharge chute for transferring the bodies from the conveyor to the chute, a plurality of spaced gripper units carried by said transfer device and mounted for independent turning movement therein for receiving can bodies from said conveyor, means for continuously moving said transfer device adjacent to and in the same direction as said conveyor to carry said gripper units successively from said conveyor to said discharge chute, gripper turning means connected with said gripper units for first retaining a gripper unit against rotation to receive a can body, said gripper turning means later turning said received can body while being carried by said moving transfer device to turn the longitudinal axis of the body transversely of said discharge chute, and holding means acting through said gripper units for holding each can body in its gripper unit during said transfer and turning movements, said holding means releasing said can body for rolling discharge into said discharge chute.

3. In a mechanism for conveying and positioning articles such as tubular can bodies and the like, the combination of feeding means for advancing said articles in a direction longitudinally of their axes, discharge means for receiving said articles with their axes in a substantially horizontal position at right angles from that in which they were advanced by said feeding means, a transfer wheel mounted for rotation in a vertical plane and disposed between said feeding means and said discharge means, means for rotating said transfer wheel adjacent said feeding means in the same direction as said articles are advanced by said feeding means, a gripper unit mounted on said transfer wheel for movement relative thereto, means on said gripper unit for receiving and holding an article, and turning means operable upon said gripper unit as it travels with said transfer wheel for turning said receiving and holding means into alignment with the longitudinal axis of an advanced article for receiving and holding said article, said turning means also acting upon said unit for shifting it relative to said transfer wheel for moving the axis of the article into said right angled position to reposition the article for discharge into said discharge means.

4. In a mechanism for conveying and positioning articles such as can bodies, the combination of a rotatable pneumatic gripper unit engageable with an article for receiving and holding said article, transfer means for moving said gripper unit along a predetermined path of travel, article turning means for turning said suction gripper unit into one position for receiving said articles in axial alignment with said path and for turning said unit and the received article into another position to reposition the article for further disposition, means for feeding said articles in the direction of and axially into said predetermined path, and valve means connecting with said pneumatic gripper unit for establishing and breaking a partial vacuum in said gripper unit in time with the travel of said unit for holding said article on and releasing it from said unit.

5. In a mechanism for conveying and positioning can bodies and the like, the combination of means for feeding a can body longitudinally in a predetermined path, a vertically disposed transfer conveyor adjacent said path, said transfer conveyor having a normally deactivated gripper member rotatably mounted at its inner end in said transfer conveyor, the outer end of said member terminating in a can body gripper, means for activating said member to initially grip said body while the body is moving along said predetermined path, means for driving said conveyor, the direction of movement of the conveyor being substantially the same as the direction of said body movement at the point where said gripper initially engages the body, a stationary cam adjacent the path of the inner end of said gripper member, cam follower means on the inner end of said gripper member and in operative following engagement with said cam to turn said gripper member and the body thereon through substantially 90°, discharge means adjacent said transfer conveyor for receiving said turned body, and means for deactivating said gripper in time to release and drop said body from the transfer conveyor into said discharge means.

JOHN E. SOCKE.

References Cited in the file of this patent

UNITED STATES PATENTS

| Number | Name | Date |
|---|---|---|
| 1,130,383 | Ellison | Mar. 2, 1915 |
| 1,263,485 | Thornburg | Apr. 23, 1918 |
| 1,428,716 | Smith | Sept. 12, 1922 |
| 1,947,610 | McNamara | Feb. 20, 1934 |
| 1,958,846 | Christensen | May 15, 1934 |
| 2,004,492 | McNamara | June 11, 1935 |
| 2,224,975 | McNamara | Dec. 17, 1940 |
| 2,335,239 | Gladfelter | Nov. 30, 1943 |
| 2,359,432 | McNamara | Oct. 3, 1944 |
| 2,415,997 | Eldred | Feb. 18, 1947 |
| 2,509,725 | Dalton | May 30, 1950 |